UNITED STATES PATENT OFFICE.

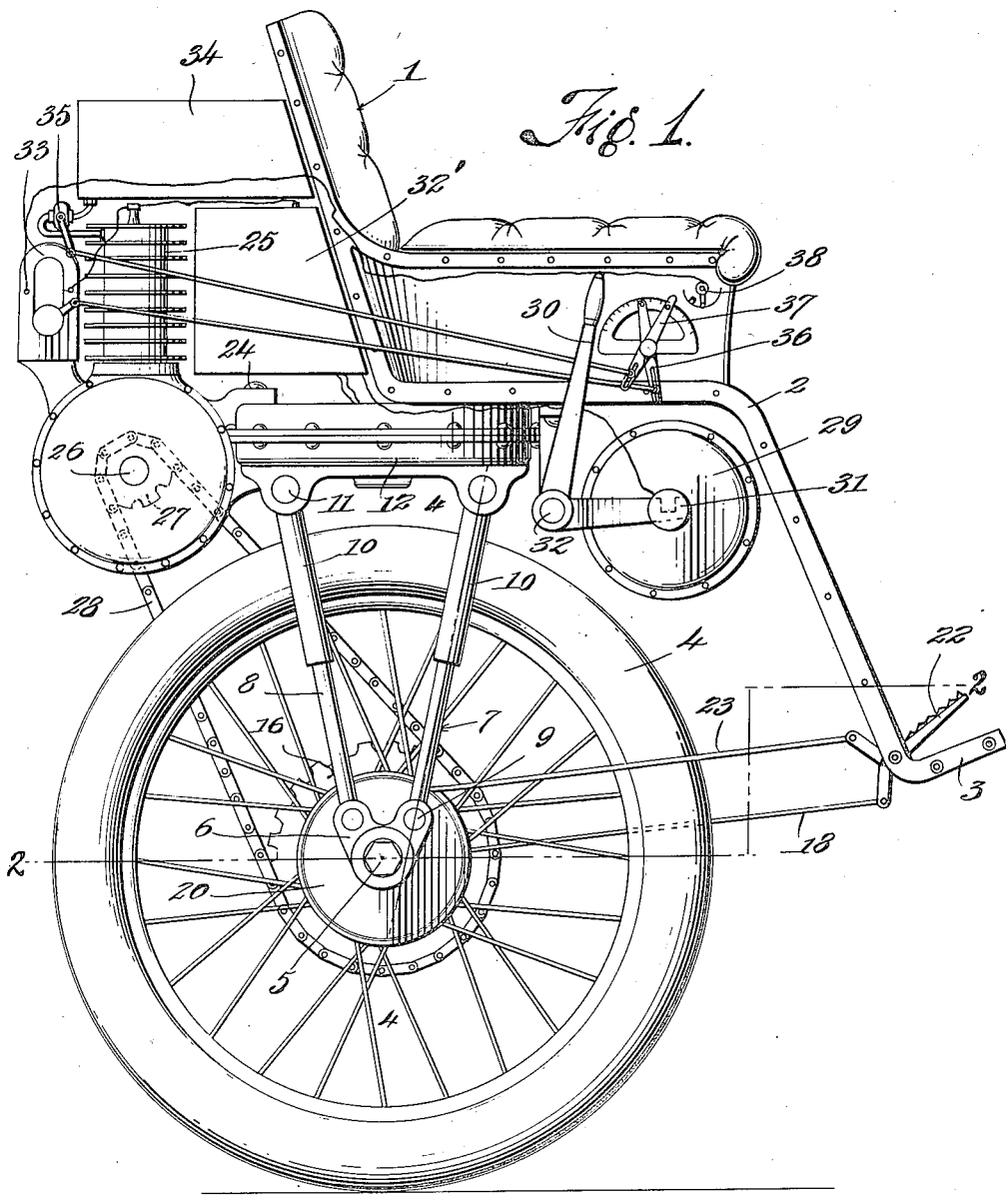

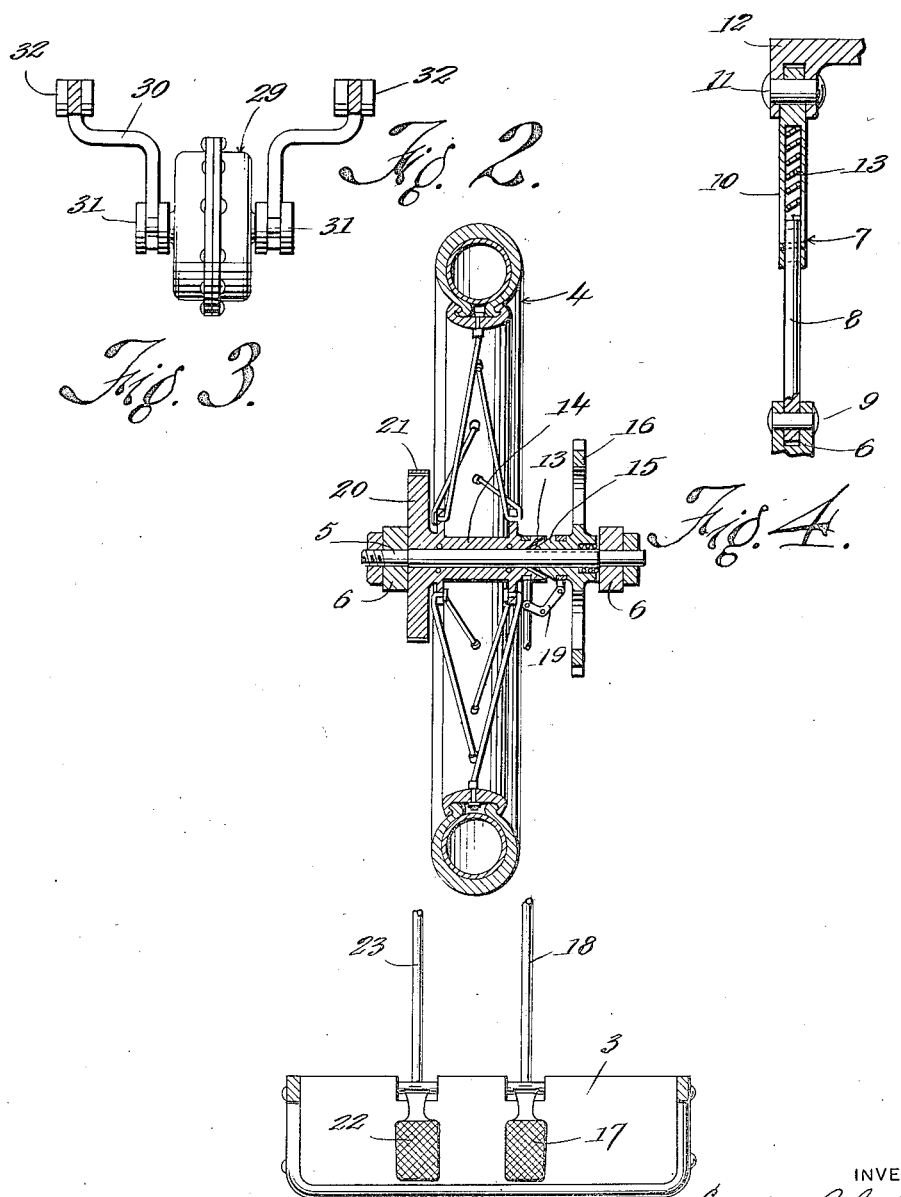

LOUIE G. WILSON, OF MORNING SUN, IOWA.

AUTOMONOCYCLE.

1,236,030.   Specification of Letters Patent.   Patented Aug. 7, 1917.

Application filed November 23, 1915. Serial No. 63,051.

*To all whom it may concern:*

Be it known that I, LOUIE G. WILSON, citizen of the United States, residing at Morning Sun, in the county of Louisa and State of Iowa, have invented certain new and useful Improvements in Automonocycles, of which the following is a specification.

My invention relates to self-propelled vehicles and more particularly to vehicles of the unicycle or monocycle type.

An object of the invention is to provide in a vehicle of the character described a novel means whereby the proper equilibrium is at all times maintained; a gyroscope being utilized in this capacity.

A further object of the invention is to provide a gyroscopic arrangement for guiding or steering the machine.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:

Figure 1 is a side elevation of my improved monocycle;

Fig. 2 is a section on the line 2—2 of Fig. 1;

Fig. 3 is a detail view of the steering gyroscope and the operating mechanism therefor; and Fig. 4 is a section on the line 4—4 of Fig. 1.

Referring now to the drawings by numerals, 1 designates the seat, 2 the seat support, 3 the foot rest, 4 the single supporting wheel (preferably equipped with a pneumatic tire) and 5 the supporting-wheel axle. Brackets 6 are mounted upon the terminals of the wheel axle 5 to afford a support means for the frame designated as an entirety by the numeral 7. Said frame 7, in its preferred embodiment may be said to consist of bars 8 (four in number) pivoted as at 9 to the respective brackets 6. The bars are arranged, two at each side of the wheel 4 and in diverging relation, each bar extending into a complemental cylinder-structure 10 therefor. The cylinder-structures 10 are pivoted as at 11 to the under side of a suitable gyroscope casing 12 within which the balancing gyroscope (not shown) is arranged. The balancing gyroscope, as illustrated in Fig. 1 is disposed to rotate on a vertical axis and in a horizontal plane directly above the supporting wheel 4 that the equilibrium of the machine or vehicle may be at all times maintained. The casing 12 is secured by any suitable means to the under side of the seat support.

Springs 13 are arranged, one within each cylinder structure 10 to abut respectively the rod 8 and the upper end of each cylinder-structure (said ends being closed). In this manner a shock absorbing means is provided which materially assists in reducing the intensity of shocks produced incident to contact of the wheels with inequalities in the road bed.

A conical recess 13 is formed in the hub 14 of the wheel 4 to afford a contact surface for a suitable sliding clutch 15 mounted on the wheel axle 5. A sprocket 16 is either mounted on or made integral with the clutch member 15 that power may be transmitted thereto in a manner hereinafter more particularly described. Movement of the clutch 15 into and out of contact with the wheel hub 14 is controlled through manipulation of a pedal 17 disposed conveniently in proximity to the foot rest 3, the mentioned pedal having connection with said clutch through the medium of a rod 18 and bell crank 19 as shown to advantage in Fig. 4.

A brake wheel 20 is mounted on the axle 5 at the opposite end thereof from that supporting the sprocket 16, said wheel being attached to or integral with the wheel hub 14. A brake band 21 is disposed to engage the periphery of said wheel 20. Operation of the brake band is controlled through manipulation of a pedal 22 mounted in proximity to the pedal 17 and connected to the band by means of a rod 23. Said rod 23 is located on the opposite side of the supporting wheel 4 from that of the rod 18.

At the rear of the seat 1 and secured as indicated at 24 to the gyroscope casing 12 is an engine 25 of the internal combustion type. The crank shaft of the engine, 26, has mounted thereon a sprocket 27 over which a chain 28 is arranged. The said chain 28 is utilized to drive the wheel axle 5 in that the sprocket 16 is in engagement therewith.

A steering gyroscope (not shown) is mounted in a suitable casing 29 therefor located forwardly of the gyroscope casing 12 and directly beneath the center of the seat support. Bell crank levers 30 located, one at each side of the seat support 3 and curved to extend therebeneath, afford a support means for the casing 29. Flanged extensions 31, concentric to the axis of the gyroscope within the casing 29, are formed, one at each side of said casing, that the levers 30 may engage therewith and thus support the gyroscope in the manner desired. The levers 30 are pivoted as at 32.

The gyroscope inclosed in the casing 29 is utilized to guide or steer the machine. When it is desired that the machine be turned to the right, it is but necessary that lever 30 on the right hand side of the seat support be moved rearwardly whereupon the extensions 31 upon the left hand side of the gyroscope casing 29 will be unsupported and the gyroscope bodily elevated beneath the seat support and solely supported by the levers 30 upon the right hand side of the machine. The "precessional" movement in evidence will cause the machine to be turned to the right. After turning, the lever is released, and the steering gyroscope permitted to fall until the extensions 31 of the gyroscope casing engage with both supporting levers whereupon the machine will proceed straight ahead.

The gyroscope casings 12 and 29 are preferably air tight that the gyroscopes contained therein may operate in a vacuum that the energy necessary to operation of the gyroscope may be minimized. Each casing contains a motor (not shown) and each motor is electrically connected to storage batteries 32' located at the rear of the seat support and directly above the gyroscope casing 12. That the machine may be operative in every detail, I provide a magneto-generator 33, a gas tank 34, a carbureter 35, magneto control 36, throttle control 37 and spark control 38, the mentioned parts being located and arranged in the manner illustrated in Fig. 1.

From the foregoing, taken in connection with the accompanying drawings it is evident that the operating mechanism is arranged in a properly balanced manner directly above the single supporting wheel 4; that the balancing gyroscope affords a means whereby the equilibrium of the machine is maintained; and that movement of the steering gyroscope as hereinbefore described is such in its nature as to permit turning movement of the machine either to the right, to the left, or completely around.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a monocycle, a supporting wheel, an axle, a frame mounted on said axle, and steering means including a gyroscope casing adapted to support a gyroscope therein for rotation in a vertical plane with the axis of rotation extended at right angles to the normal direction of travel of the monocycle, a pair of arms pivoted at opposite sides of the frame for independent oscillation in a vertical plane, and for supporting between their terminals the casing, and levers formed on said arms, whereby, to tilt the casing, whereby the supporting wheel may be rotated about a vertical axis, in one direction or the other, to change the direction of travel of the monocycle.

In testimony whereof I affix my signature in presence of two witnesses.

LOUIE G. WILSON.

Witnesses:
J. L. McCLURKIN,
HAZEL V. McCLURKIN.